Figure 1:
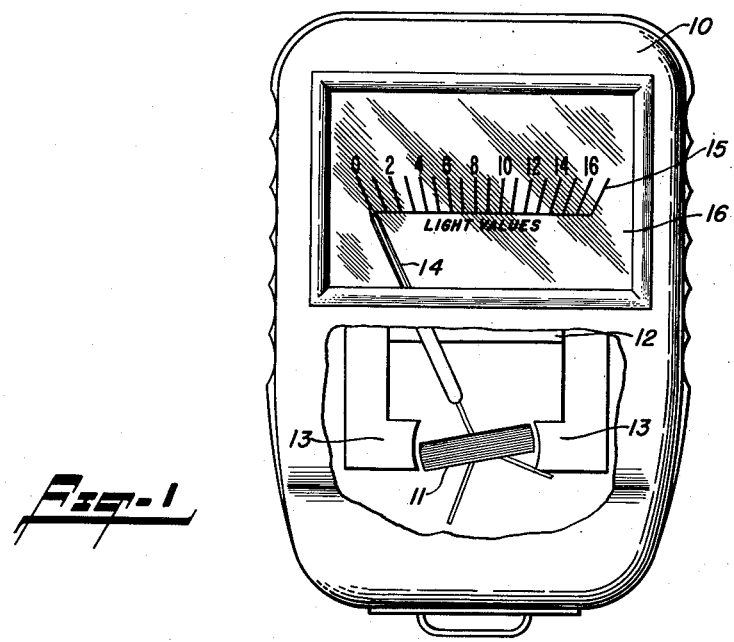

Oct. 22, 1957  A. T. WILLIAMS  2,810,319
EXPOSURE METER
Filed March 22, 1955

ALEXANDER T. WILLIAMS
INVENTOR.

BY
Rudolph L. Lurich
ATTORNEY

United States Patent Office 2,810,319
Patented Oct. 22, 1957

2,810,319

EXPOSURE METER

Alexander T. Williams, Westfield, N. J., assignor to Weston Electrical Instrument Corporation, Newark, N. J., a corporation of New Jersey Application March 22, 1955, Serial No. 495,841

1 Claim. (Cl. 88—23)

This invention relates to photoelectric exposure meters and more particularly to a device of this class designed and constructed so that the pointer deflection corresponds to the product of scene brightness and film speed and the cooperating scale is calibrated in arbitrary numbers corresponding to a predetermined ratio of camera diaphragm opening and exposure time.

Exposure meters of the general class contemplated by this invention comprise a self-generating photocell, a baffle arrangement for restricting the angular spread of light rays reaching the photocell, an electrical instrument responsive to the current generated by the photocell and a rotatable plate, calibrated in film speeds and mounted over the photocell and baffle to further control the light rays reaching the photocell. Efforts of workers in this field are continuously directed to the provision of exposure meters of minimum size, of maximum sensitivity, accuracy and stability and, importantly, to the simplification of the operation and use of the device so that it will serve its intended function without requiring much specific knowledge on the part of the user.

In photography, the correct exposure of the film is obtained by a proper setting of the camera diaphragm opening ($f$ stop) and shutter speed ($t$) according to the brightness of the scene to be photographed and the speed of the particular film employed. Most exposure meters measure or merely respond to the brightness of the scene to be photographed after which the reading is translated by a suitable calculator mechanism into a series of correct $f$ stops and shutter speeds for the particular film being used in the camera.

An object of this invention is to provide a meter so simple to use that it is not necessary to have any knowledge of $f$ stops or shutter speeds in order to obtain correct photographic exposure.

An object of this invention is the provision of a photoelectric exposure meter responsive to the factor of scene brightness multiplied by film speed and having a scale calibrated in arbitrary numbers which correspond to predetermined ratios of camera diaphragm and shutter time.

An object of this invention is the provision of a photoelectric exposure meter so designed and constructed that the product of scene brightness (B) and film speed (S) is at all times equal to the square of the diaphragm opening ($f$) divided by the shutter speed ($t$); that is, $$BS = \frac{f^2}{t}$$

These and other objects and advantages will become apparent from the following description when taken with the accompanying drawings. It will be understood, however, that the drawings are for purposes of illustration and are not to be construed as defining the scope or limits of the invention, reference being had for the latter purposes to the claim appended hereto.

Figure 2:
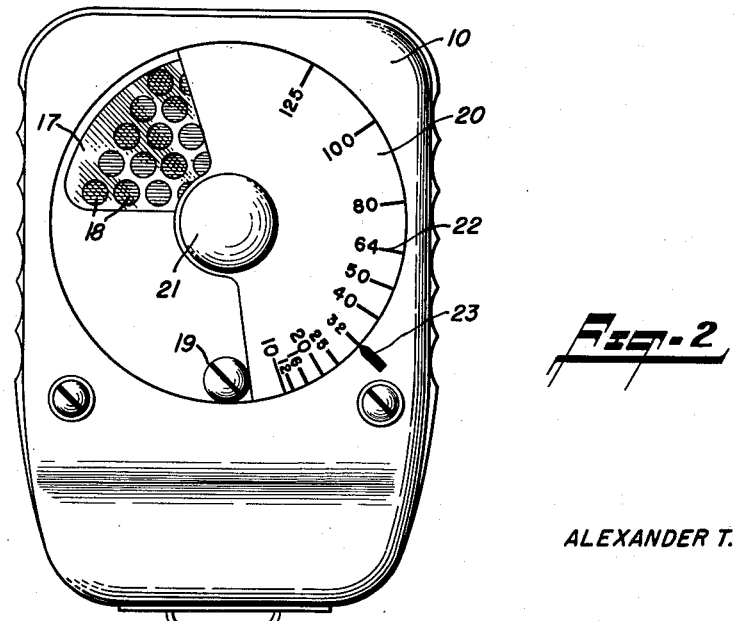

In the drawings wherein like reference characters denote like parts in the several views:

Figure 1 is a front view of an exposure meter made in accordance with this invention, with a portion of the housing broken away for purposes of illustration; and Figure 2 is a rear view of such meter.

It can be shown algebraically that $$B = \frac{Kf^2}{St}$$

where $B$ = scene brightness in candles per square foot,
$f$ = $f$ stop or ratio of the focal length of the lens to the aperture diameter,
$S$ = film speed as defined in American Standard Association Specification PH25–1954,
$t$ = exposure time in seconds and
$K$ = a constant depending upon the units used and the inherent overall design of the exposure meter. The design factors which effect $K$ are primarily the acceptance angle of the meter and the spectral response of the photoelectric cell. In this particular design $K=1$, but obviously with a different acceptance angle or type of photocell, the value of $K$ could vary. However, since $K$ does equal 1, the above equation is reduced to $$B = \frac{f^2}{St} \text{ or } BS = \frac{f^2}{t}$$

In the equation $$BS = \frac{f^2}{t}$$

it will be noted that $f^2$ and $t$ are the camera settings for the lens aperture and exposure time while B and S are the same brightness and film speed, and the product of these two factors can be calibrated into the exposure meter described in this invention.

The table below shows a series of arbitrarily-adopted numbers applied to the meter scale and the corresponding product of B (scene brightness expressed in candles per square foot) and S (film speed expressed in the accepted terms of either Weston or A. S. A. values).

| Arbitrary Number | Product (B×S) | Arbitrary Number | Product (B×S) |
|---|---|---|---|
| 4 | 16 | 11 | 2,000 |
| 5 | 32 | 12 | 4,000 |
| 6 | 64 | 13 | 8,000 |
| 7 | 125 | 14 | 16,000 |
| 8 | 250 | 15 | 32,000 |
| 9 | 500 | 16 | 64,000 |
| 10 | 1,000 | 17 | 125,000 |

Although the meter scale numbers have been termed "arbitrary," yet for convenience they are desirably arranged in arithmetical progression, with the common difference 1. The products of the corresponding brightness times speed are desirably arranged in substantially geometrical progression (this could be made exact) with the common ratio 2, whereby the meter scale numbers are correspondingly approximately evenly spaced.

The construction and calibration of the camera to be used with my exposure meter does not constitute a part of this invention. It is necessary to point out, however, that the camera has a cooperating gear arrangement so that an adjustment of the diaphragm opening ($f$) causes an automatic, predetermined adjustment of the shutter speed ($t$) and the arrangement is such as to maintain the ratio $f^2/t$ always equal to the product BS (scene brightness and film speed). The rotatable diaphragm-adjusting member includes a reference mark, or index, cooperating with a series of arbitrary numbers carried by a fixed part of the camera, such numbers corresponding to those marked on the scale of the exposure meter. For example, if the exposure meter reading is 10 this is equal to a B×S product of 1000 and to an exposure of $f=10$ and a shutter speed of $\frac{1}{10}$ second, since $f^2$ ($10^2$) divided by $t$ ($\frac{1}{10}$)=1000.

From the above it is evident that when an exposure meter (calibrated in arbitrary numbers so chosen that each represents a definite product of brightness and film speed) and a camera (calibrated in arbitrary numbers so chosen that each represents a definite ratio of $f^2$ divided by $t$) are used in combination, the problem of correct film exposure is greatly simplified. A single, directly-obtained meter reading is used to set the camera at a single exposure value, for example, if the meter indication is 12 the user merely sets the camera at 12 and the exposure setting will be correct.

There are numerous combinations of camera diaphragm openings and shutter speeds which will result in a satisfactory picture of a given scene and taken with a film of given speed. Simply stated, the larger the diaphragm opening, the shorter will be the exposure time required. Thus, the specific mechanism providing a simultaneous adjustment of the camera diaphragm opening and the shutter speed is subject to considerable design latitude. The following table lists several of the arbitrary numbers and the related combinations of diaphragm opening and shutter speed for correct film exposure.

| Arbitrary Number | Typical Combinations of $f$ stop and Exposure Time Values |
|---|---|
| 8 | ($f$:3.5—$\frac{1}{40}$ sec.) ($f$:4.5—$\frac{1}{12}$ sec.) ($f$:11—$\frac{1}{2}$ sec.), etc. |
| 10 | ($f$:4.5—$\frac{1}{50}$ sec.) ($f$:6.3—$\frac{1}{5}$ sec.) ($f$:11—$\frac{1}{8}$ sec.), etc. |
| 12 | ($f$:6.3—$\frac{1}{100}$ sec.) ($f$:8—$\frac{1}{60}$ sec.) ($f$:11—$\frac{1}{30}$ sec.), etc. |
| 14 | ($f$:8—$\frac{1}{250}$ sec.) ($f$:11—$\frac{1}{130}$ sec.) ($f$:18—$\frac{1}{50}$ sec.), etc. |

Reference is now made to the drawings. The meter comprises a housing 10, made of metal or plastic, which encloses a wire wound, pivotally mounted movable coil 11 and the associated permanent magnet 12 and pole pieces 13. A pointer 14 is secured to the movable coil and cooperates with a scale 15 marked in arbitrary numbers as shown. The scale and the end of the pointer are visible through the window 16 carried by the front of the meter housing. The photocell is exposed to light through an opening 17 in the rear of the housing. Disposed over the active surface of the photocell is a perforated baffle 18 which serves to restrict the angular spread of the light rays reaching such surface. It may here be stated that the photocell is connected to the movable coil whereby the angular rotation of the coil is related to the quantity of light impinging upon the photocell surface. In accordance with conventional practice, an adjusting screw 19 is provided for setting the meter pointer on the zero mark of the scale when light is completely blocked off from the photocell.

In order to have the meter indication correspond to the product of film speed and brightness, an opaque plate 20 is pivotally secured to the rear of the housing by a screw 21. This plate is rotatably adjustable to overlie more or less of the opening 17 and thereby to permit more or less light to strike the underlying photocell surface. The plate carries a scale 22 calibrated in terms of film speed, the line markings of such scale being selectively alignable with the fixed reference mark 23 carried on the meter housing.

If one desires to take a picture using a color film, such as Kodachrome, the plate is rotated to aline the 10 mark with the reference line 23—such film having a speed rating of 10. The meter is now held to direct the rear opening 17 toward the scene to be photographed. If, under this condition, the meter reading is 12, it is apparent that the scene brightness must be 400, since the product of scene brightness (B) and film speed (S) is 4000. When a faster film is used, say Plenachrome having a speed of 50, the plate 20 is set to aline the 50 mark with the reference line 23. If the meter indication again is 12 then the scene brightness must be 80—since 50×80=4000. Thus, when the opaque plate was set at the 10 scale mark only a relatively small area of the photocell is exposed to the light reflected from the scene and, therefore, a relatively high scene brightness is required to cause the meter pointer to deflect to the 12 mark on the meter scale 15. However, when the plate is set to the 50 mark, the exposed area of the photocell is 5 times as much as for the 10 setting, and consequently, only $\frac{1}{5}$ the scene brightness is required to deflect the meter pointer to the associated 12 mark. Thus, the use of the adjustable plate, settable in precise accordance with the relative speed of the film, makes it possible to always have the meter indicate the product of scene brightness (B) and film speed (S). The meter scale 15, of course, is precalibrated to maintain such precise relationship between the meter indication and the setting of the opaque plate.

Having now described my invention in detail in accordance with the requirements of the patent statutes, what I desire to protect by Letters Patent of the United States is set forth in the following claim.

I claim:

A direct-reading exposure meter comprising a housing having a window in the front and an opening in the back, an electrical movement disposed within the housing and including a movable coil carrying a pointer that is visible through the said window, a scale plate mounted in fixed position within the housing and carrying a scale calibrated in arbitrary numbers that are visible through the said window, a photocell mounted in the housing and connected to the movable coil, said photocell being positioned to receive light passing through the said opening, an opaque member pivotally mounted on the housing and selectively rotatable to overlie more or less of the said opening, markings carried by the opaque member and selectively alignable with a fixed reference mark carried by the housing, said markings being film speed values and the spacing between such markings being such that for each angular position of the opaque member a definite value of brightness is required to deflect the pointer to each arbitrary number on the scale, the number being that number to which a camera, calibrated in arbitrary numbers so chosen that each represents a definite ratio of $f^2$ divided by $t$, must be set in order to obtain correct exposure.

References Cited in the file of this patent

UNITED STATES PATENTS

| 2,531,936 | Fairbank et al. | Nov. 28, 1950 |
| 2,590,165 | Fairbank et al. | Mar. 25, 1952 |
| 2,596,328 | Dorsey | May 13, 1952 |
| 2,667,809 | Williams | Feb. 2, 1954 |